United States Patent [19]

Roll et al.

[11] 4,018,292

[45] Apr. 19, 1977

[54] POWER TOOL WITH DEVICE FOR PREVENTING UNINTENTIONAL TURN-ON OF DRIVE MOTOR

[75] Inventors: Karl Roll, Leinfelden; Klaus-Peter Fritschi, Merklingen, both of Germany

[73] Assignee: Robert Bosch G.m.b.H., Stuttgart, Germany

[22] Filed: Nov. 12, 1975

[21] Appl. No.: 631,188

[30] Foreign Application Priority Data

Dec. 7, 1974 Germany .......................... 2457944

[52] U.S. Cl. ................................ 173/170; 251/109

[51] Int. Cl.² ........................................ B23B 45/00

[58] Field of Search .................. 173/170, 163, 169; 251/107, 109, 89, 116, 101

[56] References Cited

UNITED STATES PATENTS

| | | | |
|---|---|---|---|
| 1,101,464 | 6/1914 | McDonald | 251/109 X |
| 1,205,237 | 11/1916 | Maliha | 173/169 X |
| 1,318,120 | 10/1919 | Wheaton | 251/109 |
| 1,483,467 | 2/1924 | Meden | 251/109 X |
| 1,681,044 | 8/1928 | Malik | 173/169 X |

*Primary Examiner*—Ernest R. Purser
*Assistant Examiner*—Richard E. Favreau
*Attorney, Agent, or Firm*—Michael J. Striker

[57] ABSTRACT

The power tool has a drive motor and a turn-on switch device activatable for turning on the drive motor. A manual activator is mounted for swinging movement in a predetermined plane of motion and in a predetermined direction from a normal position to an activating position in which it activates the turn-on switch device. The manual activator is so arranged and configurated as to be depressible in the predetermined direction by a hand of the user of the power tool. A safety device prevents unintentional activator depression and includes a blocking structure. The blocking structure is mounted for swinging movement relative to the manual activator in generally the predetermined plane and in the predetermined direction from a blocking position in which it prevents activator depression to an unblocking position in which it permits such depression. The blocking structure is comprised of one or more cooperating levers and is so configurated and located relative to the manual activator as to be depressible by a finger of the same hand which depresses the manual activator.

4 Claims, 4 Drawing Figures

POWER TOOL WITH DEVICE FOR PREVENTING UNINTENTIONAL TURN-ON OF DRIVE MOTOR

BACKGROUND OF THE INVENTION

The invention relates to a power tool provided with a switch adapted for setting the drive motor of the tool into operation, with the switch being manually activatable by a pivotable or swingable manual activator, and with the tool being provided with a safety device a component of which must be moved out of a blocking position before the manual activator can be moved for effecting drive motor turn-on.

An electromotor-driven hand-held power tool of the type in question is already known. The tool is provided with a locking member in the form of a slider shiftable in direction transverse to the direction of activating movement of the manual activator of the tool. With the activator in the switch-off position, the slider can be shifted to a blocking position preventing movement of the activator to the switch-on position. When the slider is shifted into unblocking position, the activator can then be moved into switch-on position. After the activator has been moved into switch-on position, the slider can be moved into a position preventing the activator from moving back to switch-off position. However, if the slider is not moved into the just-mentioned position after the activator has been moved into switch-on position, then the activator will automatically return to switch-off position when the hand of the user of the tool is removed from the activator.

That hand-held power tool is indeed safeguarded against unintentional drive motor turn-on. However, the need to shift the blocking member transverse to the direction of activating movement of the activator, before being able to move the activator to the turn-on position, is undesirable in many circumstances, particularly when the power tool should be capable of being quickly turned off. In the latter case,the power tool should be provided with a switch-on safety lock not requiring an additional unlocking movement. Rather, the user of the tool should be able to unlock the safety lock utilizing the same motion of his hand involved in the movement of the activator to switch-on position.

SUMMARY OF THE INVENTION

It is the general object of the invention to provide a safety lock having the characteristic just mentioned.

This object and others explained below can be met by so configurating and arranging the activator and the components of the safety device that the safety device can be released by a finger of the same hand which depresses the activator.

A particular reliable way of ensuring that the activator will not be unintentionally moved to switch-on position is by locating the safety device behind the activator so positioned as to be accessible through an opening in the activator.

It is possible to minimize the amount of movement required to release the safety lock by designing the safety lock in the form of two cooperating and interengageable levers. One lever is a release lever and the other a blocking lever. When the release lever is undepressed, the blocking lever is firmly braced against the tool housing and prevents activator depression. When the release lever is depressed, the blocking lever is not firmly braced in that way, and the activator can be depressed.

Advantageously, the arm of the release lever facing the blocking lever is designed as an abutment arm, whereas the arm of the blocking lever facing the release lever is designed as an abutment cam. A first spring braced, directly or indirectly, against the activator urges the other arm of the blocking lever against the tool housing. A second spring braced, directly or indirectly, against the activator urges the other arm of the release lever against the activator. When the release lever is undepressed, pressure exerted upon the activator in an attempt to cause activator depression will cause the activator to be braced against the other arm of the release lever, the abutment arm of the release lever to be braced against the abutment cam of the blocking lever, and the other arm of the blocking lever to be braced against the housing of the tool. If the release lever is depressed, the abutment arm of the release lever will no longer be braced against the abutment cam of the blocking lever.

In particular, it is contemplated to use the inventive safety device on pneumatically driven power tools.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
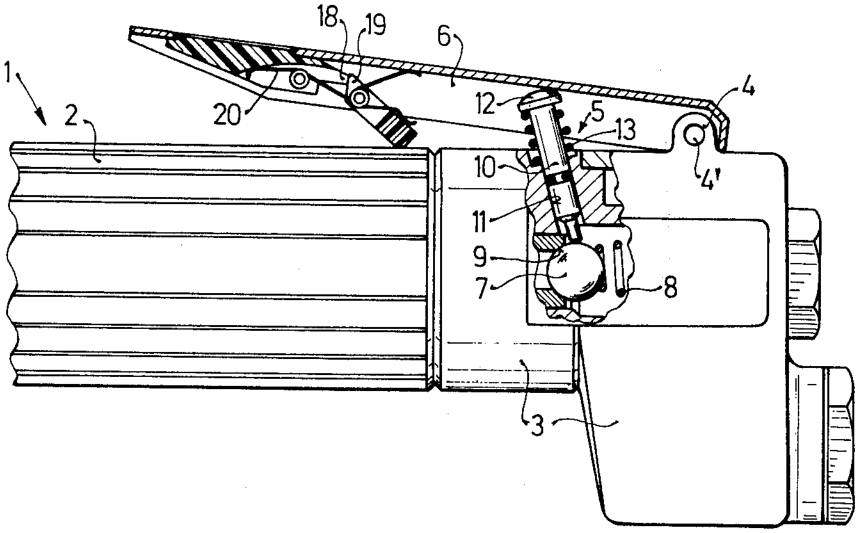
FIG. 1 is a side view of part of a pneumatically driven power tool, with the activator structure and switch device shown in section.

The housing structure of a pneumatically driven power tool 1 is comprised of a motor housing 2 and a switch housing 3. Formed integral on the switch housing 3 is an eye 4 through which passes a pivot bolt 4'. Pivoted on bolt 4' is an activator 6 depressible for activating a switch device 5. The activator 6 has the general form of a lever and is an elongated member of generally U-shaped transverse cross-section. The switch device 5 is comprised of a ball valve member 7 urged by a conical compression spring 8 against a valve seat 9 and displaceable from the seated position by means of a slider 10. The slider 10 is air-tightly guided in a bore 11 in the switch housing 3 and is provided at its outer end with a rounded head 12 with which it abuts against the inner side of the activator 6. A helical compression spring 13 surrounds slider 10 and is braced at one end against the switch housing 3 and at its other end against the head 12 of the slider 10. Compression spring 13 urges the slider 10 outwards into abutment against the activator 6.

The safety device arranged in the interior of the U-profiled activator 6 is comprised of a blocking lever 14 and a release lever 15, both of which are designed as two-armed levers. The levers 14, 15 are mounted on respective pivot pins 14', 15' oriented parallel to pivot pin 4', so that the levers 14, 15 are both pivotable in generally the same plane of motion as the pivotable activator 6.

A first torsion spring 16 presses the right arm of blocking lever 14 against the motor housing 2. Spring 16 is braced against the inner side of the activator 6 and accordingly urges the activator 6 to switch-off position. The release lever 15 is accessible through an access opening 17 in the web of the U-profiled activator 6. In this way the release lever 15 can be depressed by a finger of the same hand which depresses the activator 6. The arm of the release lever 15 facing the blocking lever 14 is designed as an abutment arm 18, whereas the arm of the blocking lever 14 facing the release lever 15 is designed as an abutment cam 19. When the release lever 15 is in undepressed condition, the abutment arm 18 of the release lever is braced against the abutment cam 19 of the blocking lever. A second torsion spring, indirectly braced against the activator 6, urges the release lever 15 agianst the activator 6 and accordingly into its normal or undepressed position relative to the activator 6.

The aforedescribed arrangement operates as follows:

If an attempt is made to depress the activator 6, the activator 6 will be firmly braced against the left arm of release lever 15, the abutment arm 18 of release lever 15 will be firmly braced against abutment cam 19 of blocking lever 14, and the right arm of blocking lever 14 will be firmly braced against the motor housing 2. Accordingly, the activator 6 cannot be depressed and turn-on of the pneumatically driven power tool is prevented.

Figure 2:
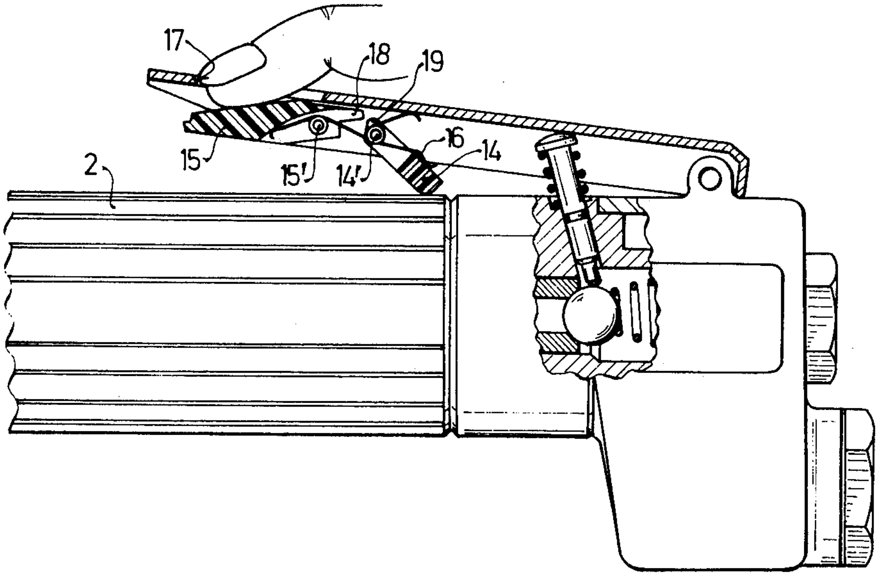
FIG. 2 is a view corresponding to that of FIG. 1, but showing the safety device in released condition.
Figure 3:
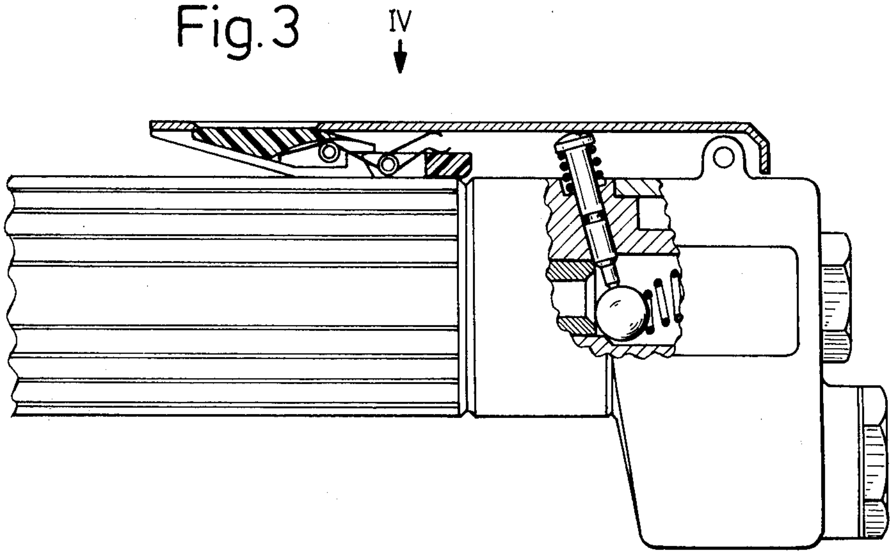
FIG. 3 is a view corresponding to that of FIG. 1, but showing the activator in switch-on position.
Figure 4:
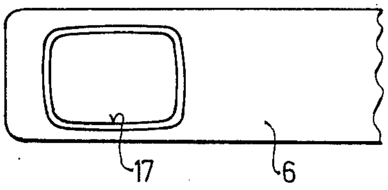
FIG. 4 is a detail of the activator and release lever as seen in the direction of arrow IV in FIG. 3.

If the finger of the hand which is endeavoring to depress the activator 6 presses through the opening 17 against the release lever 15, then the abutment arm 18 of the release lever 15 will swing away from the abutment cam 19 of the blocking lever 14, as shown in FIG. 2. If now pressure is exerted upon the activator 6, the activator will pivot against the resisting force of first torsion spring 16 into the switch-on position. In so moving, the activator 6 will cause the slider 10 to displace the ball valve member 7 from its seat and thereby set the pneumatic drive motor of the power tool into operation.

The advantages of the aforedescribed exemplary construction are that before the activator can be depressed to set the drive motor into operation the safety device must be deactivated, that the depression of the release lever of the safety device is performed in the same direction as the depression of the activator itself, so that the safety device can be deactivated and the motor turned on in substantially a single manipulation, and that when intentionally depressing the activator the release lever can be depressed using a finger of the same hand used to depress the activator.

The exemplary construction disclosed herein could of course also be used with electrical switch devices, and the like.

It will be understood that each of the elements described above, or two or more together, may also find a useful application in other types of constructions differing from the types described above.

While the invention has been illustrated and described as embodied in a pneumatically driven power tool, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims;

1. In a power tool having a drive motor, in combination, a turn-on switch device activatable for turning on the drive motor; a manual activator mounted for swinging movement in a predetermined plane of motion and in a predetermined direction from a normal position to an activating position in which it activates the turn-on switch device, the manual activator being so arranged and configurated as to be depressible in the predetermined direction by a hand of the user of the power tool; and a safety device for preventing unintentional activator depression including a blocking structure mounted for swinging movement relative to the manual activator in generally the predetermined plane and in the predetermined direction from a blocking position in which it prevents activator depression to an unblocking position in which it permits such depression, the blocking structure being so configurated and located relative to the manual activator as to be depressible by a finger of the same hand which depresses the manual activator, the power tool having a housing, and wherein the blocking structure includes a release lever and a blocking lever interengageable and cooperating with each other and both mounted for swinging movement in generally the predetermined plane, with the blocking lever being mounted to rest against the surface of the housing, the blocking lever being arranged to block activator depression when the release lever is in undepressed position, and the release lever being arranged to prevent the blocking lever from blocking activator depression when the release lever is in depressed position.

2. The power tool defined in claim 1, wherein the manual activator is provided with an access opening, and wherein the release lever is located behind the manual activator so positioned as to be accessible through the access opening by a finger of the same hand which depresses the manual activator.

3. The power tool defined in claim 1, wherein the release lever has one lever arm designed as an abutment arm and wherein the blocking lever has one lever arm designed as an abutment cam engageable with the abutment arm, wherein the safety device further includes a first spring braced upon the activator and operative for urging the blocking lever against the housing of the tool, for urging the blocking lever against the housing of the tool, and a second spring braced upon the activator and operative for pressing the release lever against the activator, the release lever and blocking lever being so disposed that when the release lever is in undepressed position the activator is braced against depression by the abutment arm of the release lever against the abutment cam of the blocking lever and by the other arm of the blocking lever against the housing of the tool, with the configuration and mounting of the release lever and blocking lever being such that when the release lever is depressed the abutment arm is no longer braced against the abutment cam.

4. The power tool defined in claim 1, wherein the power tool is a pneumatically driven power tool.

* * * * *